(12) United States Patent
Thomas et al.

(10) Patent No.: US 9,922,565 B2
(45) Date of Patent: Mar. 20, 2018

(54) SENSOR FUSION OF CAMERA AND V2V DATA FOR VEHICLES

(71) Applicant: Dura Operating, LLC, Auburn Hills, MI (US)

(72) Inventors: Gordon M. Thomas, Beverly Hills, MI (US); Nizar Trigui, Leonard, MI (US); Michael Liubakka, Northville, MI (US)

(73) Assignee: DURA OPERATING LLC, Auburn Hills, MI (US)

( * ) Notice: Subject to any disclaimer, the term of this patent is extended or adjusted under 35 U.S.C. 154(b) by 100 days.

(21) Appl. No.: 15/197,918

(22) Filed: Jun. 30, 2016

(65) Prior Publication Data

US 2017/0025017 A1   Jan. 26, 2017

Related U.S. Application Data

(60) Provisional application No. 62/194,349, filed on Jul. 20, 2015.

(51) Int. Cl.
*G06K 9/00* (2006.01)
*G08G 1/16* (2006.01)
(Continued)

(52) U.S. Cl.
CPC .......... *G08G 1/167* (2013.01); *B60W 10/18* (2013.01); *B60W 10/20* (2013.01); *B60W 30/08* (2013.01);
(Continued)

(58) Field of Classification Search
CPC ....... G08G 1/167; G08G 1/161; B60W 10/18; B60W 10/20; B60W 30/08; G06K 9/00798; G06K 9/6292; G06T 2207/30256
(Continued)

(56) References Cited

U.S. PATENT DOCUMENTS 8,050,855 B2 * 11/2011 Coy ................. G08G 1/0104
340/905
8,229,663 B2   7/2012 Zeng et al.
(Continued)

FOREIGN PATENT DOCUMENTS

CN    101799992 B    1/2013
EP      1530186 A2    5/2005
KR    20150074750 A    7/2015

OTHER PUBLICATIONS

Barria J A et al; "Detection and Classification of Traffic Anomalies Using Microsoft Traffic Variables" IEEE Transactions on Intelligent Transportation Systems, IEEE, Piscataway, NJ USA vol. 12, No. 3 Sep. 1, 2011.

*Primary Examiner* — Krishnan Ramesh
(74) *Attorney, Agent, or Firm* — Robert E. Ford; Steven L. Crane; Raymond J. Vivacqua

(57) ABSTRACT

A method for fusing sensor information detected by a host vehicle and at least one remote vehicle-to-vehicle (V2V) communication equipped vehicle includes collecting visual data from an optical sensor of a vision sub-system, and collecting V2V data from remote vehicles. The method further includes executing a control logic including a first control logic for generating a base lane model and a base confidence level, a second control logic that fuses together the V2V data, the base lane model, and the base confidence level, and a third control logic that generates from the fused lane model, the V2V data, the base lane model, and the base confidence level, a final lane model and final confidence level, and assigns a priority to the final lane model.

10 Claims, 3 Drawing Sheets

(51) Int. Cl.
G06K 9/62 (2006.01)
H04L 29/08 (2006.01)
B60W 10/18 (2012.01)
B60W 10/20 (2006.01)
B60W 30/08 (2012.01)
B60W 30/12 (2006.01)
G06T 11/60 (2006.01)

(52) U.S. Cl.
CPC ......... *B60W 30/12* (2013.01); *G06K 9/00798* (2013.01); *G06K 9/6215* (2013.01); *G06K 9/6292* (2013.01); *G06T 11/60* (2013.01); *G08G 1/161* (2013.01); *H04L 67/12* (2013.01); *B60W 2400/00* (2013.01); *B60W 2420/42* (2013.01); *B60W 2510/18* (2013.01); *B60W 2510/20* (2013.01); *B60W 2550/10* (2013.01); *G06T 2207/30256* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 8,452,535 B2* | 5/2013 | Zeng | ..................... | B60W 30/12 342/357.33 |
| 8,605,947 B2* | 12/2013 | Zhang | ................ | G06K 9/00798 348/116 |
| 9,280,899 B2* | 3/2016 | Biess | ..................... | G08G 1/163 |
| 9,784,592 B2* | 10/2017 | Gupta | ................... | B60W 30/00 |
| 2007/0043502 A1 | 2/2007 | Mudalige et al. | | |
| 2010/0036595 A1* | 2/2010 | Coy | ..................... | G08G 1/0104 701/119 |
| 2010/0098295 A1* | 4/2010 | Zhang | ................ | G06K 9/00798 382/103 |
| 2010/0104199 A1* | 4/2010 | Zhang | ................ | G06K 9/00798 382/199 |
| 2011/0190972 A1* | 8/2011 | Timmons | ............... | G01C 21/34 701/31.4 |
| 2012/0150437 A1* | 6/2012 | Zeng | ..................... | B60W 30/12 701/456 |
| 2012/0314070 A1 | 12/2012 | Zhang et al. | | |
| 2013/0278443 A1 | 10/2013 | Rubin et al. | | |
| 2014/0257686 A1 | 9/2014 | Feldman et al. | | |
| 2014/0379164 A1* | 12/2014 | Joh | ....................... | G01C 21/30 701/1 |
| 2015/0046078 A1* | 2/2015 | Biess | ..................... | G08G 1/166 701/301 |
| 2016/0357262 A1* | 12/2016 | Ansari | ..................... | G06F 3/017 |
| 2017/0016734 A1* | 1/2017 | Gupta | ................ | G01C 21/3697 |
| 2017/0059713 A1* | 3/2017 | Heo | ....................... | G01S 17/936 |

* cited by examiner

SENSOR FUSION OF CAMERA AND V2V DATA FOR VEHICLES

CROSS REFERENCE TO RELATED APPLICATIONS

The present application claims the benefit of U.S. Provisional Patent application No. 62/194,349, filed on Jul. 20, 2015, the subject matter of which is incorporated herein by reference.

FIELD

The invention relates generally to a driver assistance system for a motor vehicle, and more particularly to a driver assistance system that fuses data from optical sensors and vehicle-to-vehicle communication sub-systems.

BACKGROUND

The statements in this section merely provide background information related to the present disclosure and may or may not constitute prior art.

Motor vehicle sensing systems are known which can identify to a host vehicle other proximate motor vehicles and warn an operator of the host vehicle of the other vehicle's movements which may intersect the driving path of the host vehicle. Other motor vehicle sensing systems are known which can utilize the data received from the above noted sensing system and institute changes such as to reduce a host vehicle driving speed, apply brakes, provide audio and visual warning signals and the like. Known systems may utilize camera systems that receive visual data related to the one or more other vehicles and may utilize a computer system to perform calculations and generate vehicle command instructions. Other known systems include the vehicle-to-vehicle (V2V) system which allows multiple vehicles to communicate to each other.

While conventional vehicle communication and sensing systems are effective, there is room for improved vehicle communication and sensing systems that improve the data quality, failsafes, diagnostics, robustness, and accuracy of vehicle communication and sensing systems.

SUMMARY

In one aspect of the present invention, a method for fusing sensor information detected by a host vehicle and at least one remote vehicle-to-vehicle (V2V) communication equipped vehicle is provided. The method includes collecting visual data from an optical sensor of a vision sub-system, and generating a base lane model and a base confidence level. The method further includes collecting V2V data from a receiver of a V2V sub-system. The method further includes generating a base lane model and a base confidence level from the visual data. The method further includes fusing together the V2V data, the base lane model, and the base confidence level. The method further includes generating a final lane model with a final confidence level from the fused together V2V data, the base lane model and the base confidence level, and assigning a priority to the final lane model.

In another aspect of the present invention, the final confidence level indicates that the final lane model is more accurate than the base lane model.

In yet another aspect of the present invention, the base lane model and the final lane model comprise lane positioning, lane markings, lane curvature, speed, and trajectory data for the host vehicle and for any objects within a predefined area around the host vehicle.

In yet another aspect of the present invention, the V2V data comprises lane positioning, speed, and trajectory data for any remote V2V equipped vehicles in communication with the host vehicle and within a predefined area around the host vehicle, and for any objects sensed by any remote V2V vehicles in communication with the host vehicle and within a predefined area around the host vehicle In yet another aspect of the present invention, the fusing together of the V2V data, the base lane model, and the base confidence level further comprises comparing the visual data to the V2V data and determining a relative accuracy and precision of the visual data and the V2V data.

In yet another aspect of the present invention, the assigning a priority to the final lane model further comprises determining a location of an object in the final lane model relative to the host vehicle and assigning a high priority to the object when the object is in a lane also occupied by the host vehicle.

In yet another aspect of the present invention, the method further comprises sending a command to at least one advanced driver assistance system (ADAS), and wherein the at least one ADAS performs a function to avoid the object to which a high priority has been assigned.

In yet another aspect of the present invention, a method of using vehicle-to-vehicle (V2V) communication and an optical sensor to inventory and communicate to an advanced driver assistance system (ADAS) a host vehicle position relative to a plurality of objects is provided. The method includes capturing from the optical sensor an image of a road segment having a first plurality of objects and lane markings. The method further includes analyzing the image and determining a first status of each of a first plurality of objects, a first location of each of the first plurality of objects, a location of the lane markings relative to each of the first plurality of objects, and relative to the host vehicle. The method further includes assigning a first confidence level to each of the first status, the first location, and the first plurality of objects. The method further includes processing the image to determine a first local dynamic map of the road segment, the lane markings, and the first plurality of objects. The method further includes receiving a signal by a V2V equipped vehicle within a predetermined area around the host vehicle, wherein the signal includes a second status of each of a second plurality of objects, and a second location of each of the second plurality of objects. The method further includes assigning a second confidence level to the second status, the second location, and the second plurality of objects. The method further includes processing the signal by the V2V equipped vehicle to determine a second local dynamic map of the road segment and the second plurality of objects. The method further includes combining the first local dynamic map and the second local dynamic map and generating a third local dynamic map, wherein the third local dynamic map includes a third status of each of a third plurality of objects, and a third location of each of a third plurality of objects. The method further includes assigning a third confidence level and a priority to the third status, and third location of the third plurality of objects, and communicating to the ADAS the priority of the third status and third location of the third plurality of objects relative to the position of the host vehicle, wherein the ADAS automatically avoids the third plurality of objects.

In yet another aspect of the present invention, the generating the third local dynamic map further comprises fusing the signal with the image, wherein the third local dynamic map includes a position of the lane markings relative to the third plurality of objects.

In yet another aspect of the present invention the assigning a third confidence level further comprises the third confidence level being greater than the first confidence level and the second confidence level.

In yet another aspect of the present invention the assigning the priority to the third plurality of objects further comprises assigning a high priority to an object that is in a lane shared by the host vehicle and in the path of the host vehicle, wherein the lane is defined by the lane markings.

In yet another aspect of the present invention the communicating to the ADAS further comprises applying a host vehicle braking system to avoid the object that is in the lane shared by the host vehicle when the object is in the path of the host vehicle.

In yet another aspect of the present invention the communicating to the ADAS further comprises applying a host vehicle steering system and directing the host vehicle to remain within the lane.

In yet another aspect of the present invention, a system for fusing sensor information detected by a host vehicle and at least one remote vehicle-to-vehicle (V2V) communication equipped vehicle includes a vision sub-system having an optical sensor, and a V2V sub-system having a receiver. The system further includes a controller in communication with the vision sub-system and the V2V sub-system, the controller having memory for storing control logic and a processor configured to execute the control logic, the control logic including a first control logic for collecting visual data from the vision sub-system, and from the visual data generating a base lane model and a base confidence level. The system further includes the processor including a second control logic for collecting V2V data from the V2V sub-system, and for fusing together the V2V data and the base lane model and base confidence level. The system further includes the processor including a third control logic for generating, from the fused V2V data, base lane model and base confidence level, a final lane model with a final confidence level, and the processor including a fourth logic for assigning a priority to the final lane model.

In yet another aspect of the present invention the final confidence level indicates that the final lane model is more accurate than the base lane model.

In yet another aspect of the present invention, the base and the final lane models comprise lane positioning, lane markings, lane curvature, speed, and trajectory data for the host vehicle and for any objects within a predefined area around the host vehicle.

In yet another aspect of the present invention, the V2V data comprises lane positioning, speed, and trajectory data for any remote V2V equipped vehicles in communication with the host vehicle and within a predefined area around the host vehicle, and for any objects sensed by any remote V2V vehicles in communication with the host vehicle and within a predefined area around the host vehicle.

In yet another aspect of the present invention, the controller fuses together further comprises comparing the visual data to the V2V data and determining an accuracy and a precision of the visual data and the V2V data.

In yet another aspect of the present invention, the fourth logic further comprises determining a location of an object in the final lane model relative to the host vehicle and assigning a high priority to the object when the object is in a lane also occupied by the host vehicle.

In yet another aspect of the present invention, information about the object that has been assigned a high priority is passed to the at least one ADAS, and the at least one ADAS performs a function to avoid the object.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
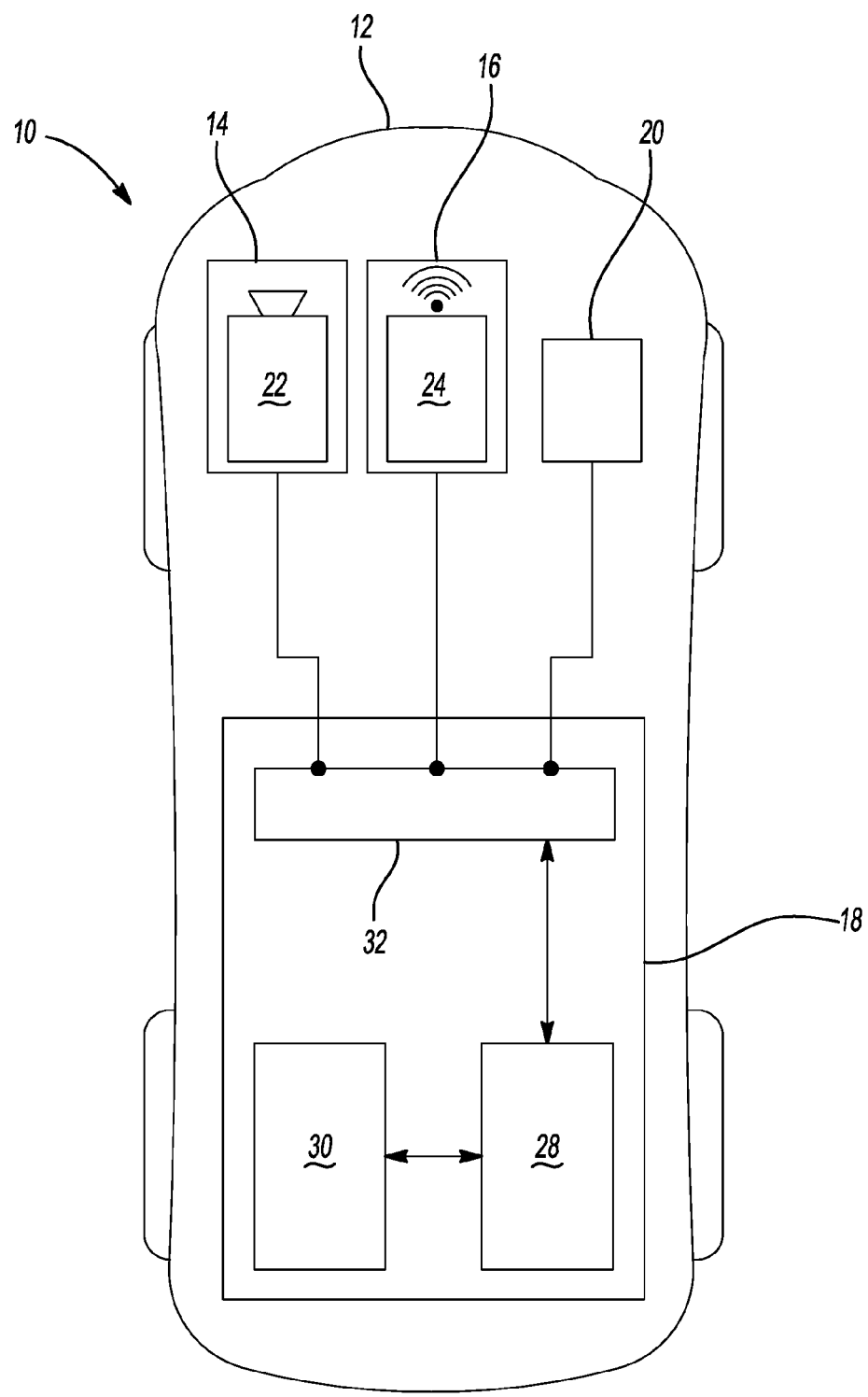
FIG. 1 is a diagram of a host vehicle of a system and method of fusing data from a combination of a vision sub-system and a V2V sub-system according to the principles of the present invention.
Figure 2:
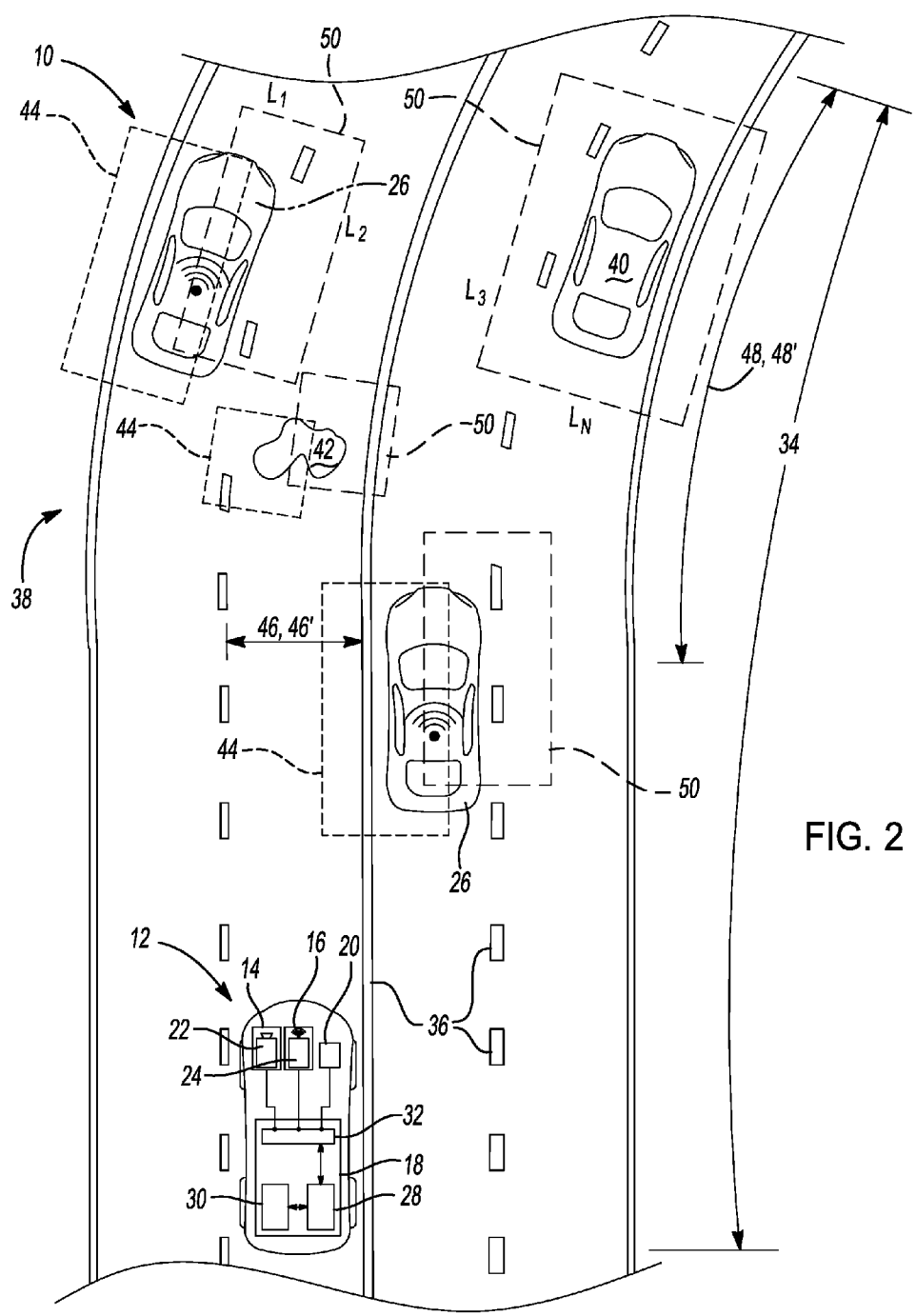
FIG. 2 is a diagram of a system and method of fusing data from a combination of a vision sub-system and a V2V communication sub-system according to the principles of the present invention.

With reference to FIGS. 1 and 2, a system for fusing together visual or optical data and vehicle-to-vehicle (V2V) data is generally indicated by reference number 10. The system 10 generally includes a host vehicle 12 having vision sub-system 14 and a vehicle-to-vehicle (V2V) communication sub-system 16. The vision sub-system 14 and the V2V communication sub-system 16 are in communication with a controller 18. Generally, the system 10 continuously collects and fuses together data from the vision sub-system 14 and the V2V sub-system 16 within the controller 18. The collected and fused together data from the vision sub-system 14 and V2V sub-system 16 is sent to a vehicle control system engine control unit (ECU) 20 within the host vehicle 12. The vehicle control system ECU 20 parses the collected and fused together data and commands an action, such as an advanced driver assistance system (ADAS) function, by the host vehicle 12.

The vision sub-system 14 includes one or more optical sensors or cameras 22. The camera 22 is operable to collect visual information in a predefined area surrounding the host vehicle 12. Visual data from the camera 22 is communicated to the controller 18. The V2V sub-system 16 includes a receiver 24 operable to receive wireless data from remote V2V equipped vehicles, indicated by reference number 26 in FIG. 2. The V2V data received from the receiver 24 may include GPS data, camera data, and/or object lists. The V2V data is communicated to the controller 18.

The controller 18 is a non-generalized, electronic control device having a preprogrammed digital computer or processor 28, memory or non-transitory computer readable medium 30 used to store data such as control logic, instructions, image data, lookup tables, etc., and a plurality of input/output peripherals or ports 32. The processor 28 is configured to execute the control logic or instructions. The controller 18 may have additional processors or additional integrated circuits in communication with the processor 28, such as perception logic circuits for analyzing the visual data or dedicated V2V circuits.

The vehicle control system ECU 20 may be any vehicle control system such as a braking control system, throttle control system, steering control system, body control system, etc. The vehicle control system ECU 20 includes ADAS functions that automate, adapt, or enhance vehicle systems in order to increase vehicle safety and/or operator driving performance. For example, the vehicle control system ECU 20 may include ADAS technologies that alert the driver to potential problems or to avoid collisions by implementing safeguards, such as autonomously controlling the host vehicle 12. The vehicle control system ECU 20 may also include ADAS features that enhance certain systems, such as automated lighting, automated parking, adaptive cruise control, automated braking, or improved blind spot elimination using camera technology.

Figure 3:
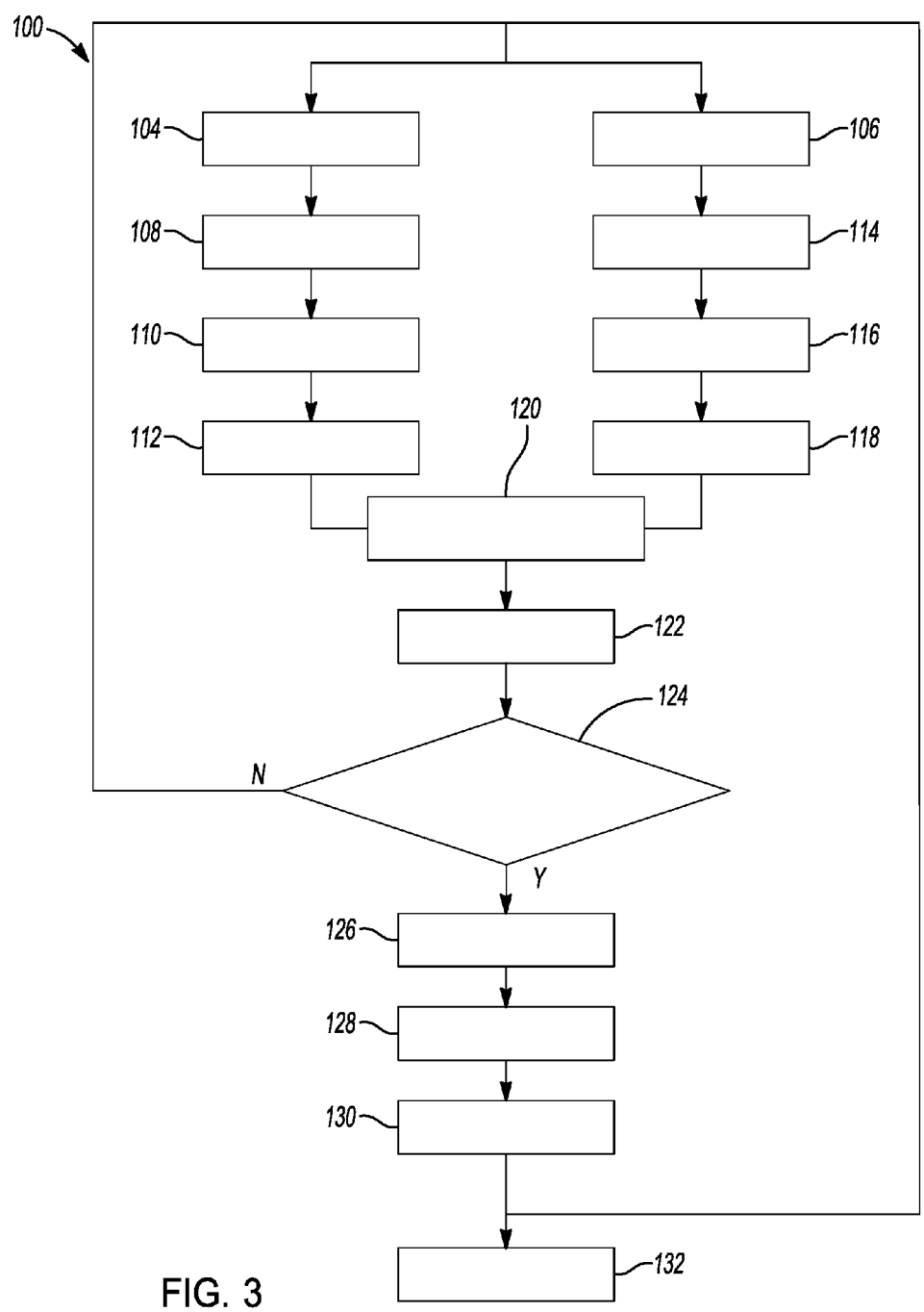
FIG. 3 is a flowchart of the method of fusing data from a combination of the vision sub-system and the V2V communication sub-system according to the principles of the present invention.

Turning now to FIG. 3, and with continued reference to FIGS. 1 and 2, a method for fusing together the data from the vision sub-system 14 and the V2V sub-system 16 is generally indicated by reference number 100. For illustrative purposes, the method 100 will be described with the host vehicle 12 operating on an exemplary road segment 34, shown in FIG. 2. The road segment 34 has lanes $L_1$, $L_2$, $L_3$, to $L_n$. It should be appreciated that the road segment 34 may have as few as one lane without departing from the scope of the present disclosure. The lanes $L_1$ to $L_n$ are defined by lane markings 36. The lane markings 36 may be reflective paint, reflectors, traffic cones or barrels, grooves, etc. The road segment 34 is illustrated as partially curved but may have any shape and have any topography without departing from the scope of the present disclosure.

In the present example, the road segment 34 is populated with a plurality of objects 38 including two remote V2V equipped vehicles 26, one non-communicative vehicle 40, and one road hazard 42. It should be appreciated that the road segment 34 may be populated by any number and combination of remote V2V equipped vehicles 26, non-communicative vehicles 40, and road hazards 42. The non-communicative vehicles 40 may be vehicles without V2V systems or may be remote V2V equipped vehicles 26 that are disposed outside a communication range of the host vehicle 12. The road hazard 42 may anything on the road segment 34, including pedestrians, animals, debris, construction barrels, disabled vehicles, etc.

The method 100 begins at blocks 104 and 106. At block 104, the camera 22 continuously captures visual data of the road segment 34. The visual data may be in a forward arc or a surround view relative to the host vehicle 12. In the present example, the visual data includes the plurality of objects 38. At block 108, the controller 18 continuously analyzes the visual data captured by the camera 22 at block 104 and generates a first object list and a first information set. The first object list is populated with the plurality of objects 38. The first information set comprises object characteristics generated by the controller 18 based on the visual data from the camera 22. In one aspect, the first information set includes a first size and a first location corresponding to each of the plurality of objects 38 within the first object list. The first size and first location are dynamically updated. The first size and the first location are schematically shown as dashed boxes having small dashes indicated by reference numbers 44 in FIG. 2. The first size and first location 44 of each of the objects 38 may be offset from the actual size and location of each of the objects 38 due to camera or processing inaccuracies. The controller 18 uses the dynamically updated first size and first location 44 of each of the plurality of objects 38 to determine a relative position and velocity for each of the plurality of objects 38 in the first object list.

At block 110 the controller 18 generates a first dynamic model of the road segment 34 and the plurality of objects 38. The first dynamic model includes a first map of the road segment 34 with the plurality of objects 38 located within the first map. The first map of the road segment 34 includes a first lane information including a first lane count, a first lane width 46, and first lane curvature 48, etc., that characterize the lanes $L_1$ to $L_n$. The method continues to block 112 where the controller 18 assigns a first lane information confidence level to the first dynamic model of the road segment 34. The first confidence level is an assessment of a reliability of the data from the camera 22. The first confidence level may be based on the known tolerances, range, field of view, and/or visual fidelity of the camera 22.

At block 106 the V2V sub-system 16 of the host vehicle 12 continuously receives V2V data pertaining to the road segment 34 from the remote V2V equipped vehicles 26. The V2V data may be transmitted to the receiver 24 via any wireless communication method including Dedicated Short Range Communications (DSRC). The V2V data may include geographic location system information, light detection and ranging (LIDAR), radio detection and ranging (RADAR), and/or visual data in a forward arc or a surround view relative to each of the remote V2V equipped vehicles 26. In the present example, the V2V data includes the plurality of objects 38. At block 114, the controller 18 continuously analyzes the V2V data received by the receiver 24 at block 106 and generates a second object list and a second information set. The second object list is populated with the plurality of objects 38. The second information set comprises object characteristics generated by the controller 18 based on the V2V data from the receiver 24. In one aspect, the second information set includes a second size and a second location corresponding to each of the plurality of objects 38 within the second object list. The second size and second location are dynamically updated. The second size and the second location are schematically shown as dashed boxes having large dashes indicated by reference numbers 50 in FIG. 2. The second size and second location 50 of each of the objects 38 may be offset from the actual size and location of each of the objects 38 due to camera, GPS, LIDAR, RADAR, or processing inaccuracies. The controller 18 uses the dynamically updated second size and second location 50 of each of the plurality of objects 38 to determine a relative position and velocity for each of the plurality of objects 38 in the second object list.

At block 116 the controller 18 generates a second dynamic model of the road segment 34 and the plurality of objects 38. The second dynamic model includes a second map of the road segment 34 with the plurality of objects 38 located within the second map. The second map of the road segment 34 includes a second lane information including a second lane count, a second lane width 46', and second lane curvature 48', etc., that characterize the lanes $L_1$ to $L_n$. The method continues to block 118 where the controller 18 assigns a second lane information confidence level to the second dynamic model of the road segment 34. The second confidence level is an assessment of a reliability of the data from the V2V sub-system 16. The second confidence level may be based on the known tolerances, range, field of view, and/or data fidelity of the GPS, LIDAR, RADAR, and/or cameras 22 of the remote V2V equipped vehicles 26.

At block 120, the controller 18 performs a first weighted analysis of the first dynamic model of the road segment 34 based on the first confidence level. In one aspect, the first weighted analysis of the first dynamic model includes making a qualitative assessment of each of the first size and first location 44, the first lane width 46, and the first lane curvature 48, relative to each of the plurality of objects 38. The qualitative assessment of the first size and first location 44 is weighed relative to the first confidence level, and a weighted first dynamic model is generated for the first information set. Additionally, the controller 18 performs a second weighted analysis of the second dynamic model of the road segment 34 based on the second confidence level. In one aspect, the second weighted analysis of the second dynamic model includes making a qualitative assessment of each of the second size and second location 50, the second lane width 46', and the second lane curvature 48' relative to each of the plurality of objects 38. The qualitative assessment of the second size and second location 50 is weighed relative to the second confidence level, and a weighted second dynamic model is generated for the second information set. In each of the first and second weighted dynamic models, information within the respective first and second information sets is given greater weight when a higher confidence level is assigned. For example, on a confidence level scale from 0-5, a road hazard 42 near a periphery of the range of the host vehicle camera 22 may be assigned a low confidence level, such as 1. The low rating is assigned because the known tolerances, range, field of view, and/or visual fidelity of the camera 22 is relatively lower at the periphery than it is very near and within field of view of the camera. With further reference to the above example, a road hazard 42 very near and within the field of view of the camera 22 may be assigned a high confidence level rating, such as 4 or 5. In an aspect, a road hazard 42 detected by remote V2V equipped vehicles 26 with high fidelity, and within known tolerances, range, and field of view of the GPS, LIDAR, RADAR, and/or cameras 22 of the remote V2V equipped vehicles 26, will be assigned a high confidence level. Moreover, at block 120 the controller 18 combines the fused object list and the fused dynamic map to create a fused lane information, including a fused lane count, a fused lane width 46'', and fused lane curvature 48'', etc., that characterize the lanes $L_1$ to $L_n$.

At block 122 the controller 18 generates a fused confidence level for the fused dynamic model and the fused object list generated at block 120. The fused confidence level is a refinement of the first confidence level and the second confidence level. To generate the fused confidence level, the controller 18 tallies the confidence levels assigned to any of the plurality of objects 38 by either the first or the second weighted analyses, and applies additional scrutiny to the plurality of objects 38 according to the assigned confidence levels of the objects in the fused object list.

The method then proceeds to block 124 where the controller 18 compares the fused confidence level to the first confidence level and the second confidence level. If the fused confidence level is lower than either of the first confidence level or the second confidence level, or if the fused confidence level is lower than the combined first and second confidence levels, the method returns to block 102, and the controller 18 collects data from the camera 22 and the V2V sub-system 16 once more. However, if the fused confidence level is greater than the first confidence level and the second confidence level combined, then the method proceeds to block 126.

At block 126, if any of the plurality of objects 38 is detected by only one of the vision sub-system 14 or the V2V sub-system 16, the singly-detected object receives only a single weight from whichever system made the detection. For example, in FIG. 2, the non-communicative vehicle 40 is depicted as only having a second size and second location 50 due to having been detected only by the V2V sub-system 16. In the example, because the non-communicative vehicle 40 has only been singly-detected, it only receives a single confidence level valuation, and therefore, only a single weight and scrutiny. By comparing the fused confidence level to the first and the second confidence levels, erroneous visual or V2V data may be disregarded. For an additional example, an erroneous or hacked V2V message may be received by the V2V sub-system 16 stating that a road hazard 42 exists in a location near the host vehicle and in the same lane as the host vehicle where in reality there is no road hazard 42. In the example, the visual data retrieved from the cameras 22 would not show the road hazard 42. While the V2V-identified road-hazard 42 is assigned a high confidence level, because the road hazard 42 would be a singly-detected object, when fused with the visual data from the cameras 22, the fused confidence level with respect to the erroneously-reported road hazard 42 would decrease significantly, and the decreased fused confidence level would be more accurate.

However, when any of the plurality of objects 38 is singly-detected the singly-detected objects are continuously monitored by whichever of the vision sub-system 14 and the V2V sub-system 16 has made the detection to determine in which lane each of the singly-detected objects resides. Furthermore, singly-detected objects may be detected by both the vision sub-system 14 and the V2V sub-system 16 if the singly-detected objects come into the range and field of view of each respective sub-system.

At block 128, the controller 18 determines which of the plurality of objects 38 is in lanes of interest. In one aspect, the lanes of interest are the lane in which the host vehicle 12 is traveling $L_1$, and the lanes immediately adjacent to the lane in which the host vehicle is traveling $L_2$, $L_3$. Any of the plurality of objects 38 that are in lanes of interest are dynamically assigned a high priority status by the controller 18 at block 130. Since objects of the plurality of objects 38 on a road segment 22 are in motion relative to the host vehicle 12, the controller 18 continuously updates the fused object list, fused dynamic map, and fused lane information by repeating the method between blocks 102 and 130 continuously. Once the controller 18 assigns a high priority value to an object at block 128 and processes it for vehicle control system ECU 20 ADAS functions at block 130, an output is generated to a vehicle control system such as a host vehicle 12 braking system or steering system. In several aspects, an object in the same lane or a lane adjacent to the host vehicle 12 may be given a high priority status. In one aspect when a high priority status is assigned to an object in the same lane as the host vehicle 12, the controller 18 engages the vehicle control system ECU 20 to perform an ADAS function such as collision avoidance, and the vehicle control system ECU 20 engages a host vehicle 12 braking system. In an aspect, an object may be assigned a high priority when the object is in an adjacent lane and the vehicle control system ECU 20 ADAS function is lane change assistance. When the vehicle control system ECU 20 ADAS function is lane change assistance, the vehicle control system ECU 20 engages a host vehicle 12 steering system. Thus, the prioritized list of objects from the fused object list and fused lane information is transmitted to the vehicle control system ECU 20 for processing in various ADAS applications.

At block 132, the vehicle control system ECU 20 performs an ADAS function according to the requirements dictated by prioritized list of objects from the controller 18. While the vehicle control system ECU 20 performs ADAS functions with improved performance because the vehicle control system ECU 20 acts on prioritized object and lane information that has been validated by two independent systems, as described above, the vehicle control system ECU 20 continues to be capable of performing ADAS functions according to input from only one of the vision sub-system 14 and the V2V sub-system 16.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for fusing sensor information detected by a host vehicle and at least one remote vehicle-to-vehicle (V2V) communication equipped vehicle, the method comprising:
    collecting visual data from an optical sensor of a vision sub-system, and generating a base lane model and a base confidence level from the visual data;
    collecting V2V data from a receiver of a V2V sub-system;
    fusing together the V2V data, the base lane model, and the base confidence level;
    generating a final lane model with a final confidence level from the fused together V2V data, the base lane model and the base confidence level;
    assigning a priority to the final lane model; and
    determining a location of an object in the final lane model relative to the host vehicle and assigning a high priority to the object when the object is in a lane also occupied by the host vehicle, and sending a command to at least one advanced driver assistance system (ADAS), and wherein the at least one ADAS performs a function to avoid the object to which a high priority has been assigned.

2. The method of claim 1 wherein the final confidence level indicates that the final lane model is more accurate than the base lane model.

3. The method of claim 2 wherein the base lane model and the final lane model comprise lane positioning, lane markings, lane curvature, speed, and trajectory data for the host vehicle and for any objects within a predefined area around the host vehicle.

4. The method of claim 3 wherein the V2V data comprises lane positioning, speed, and trajectory data for any remote V2V equipped vehicles in communication with the host vehicle and within a predefined area around the host vehicle, and for any objects sensed by any remote V2V vehicles in communication with the host vehicle and within a predefined area around the host vehicle.

5. The method of claim 1, wherein the fusing together of the V2V data, the base lane model, and the base confidence level further comprises comparing the visual data to the V2V data and determining a relative accuracy and precision of the visual data and the V2V data.

6. A system for fusing sensor information detected by a host vehicle and at least one remote vehicle-to-vehicle (V2V) communication equipped vehicle, the system comprising:
    a vision sub-system having an optical sensor;
    a V2V sub-system having a receiver;
    a controller in communication with the vision sub-system and the V2V sub-system, the controller having memory for storing control logic and a processor configured to execute the control logic, the control logic including a first control logic for collecting visual data from the vision sub-system, and from the visual data generating a base lane model and a base confidence level;
    the processor including a second control logic for collecting V2V data from the V2V sub-system, and for fusing together the V2V data and the base lane model and base confidence level;
    the processor including a third control logic for generating, from the fused V2V data, base lane model and base confidence level, a final lane model with a final confidence level;
    the processor including a fourth logic for assigning a priority to the final lane model; and
    determining a location of an object in the final lane model relative to the host vehicle and assigning a high priority to the object when the object is in a lane also occupied by the host vehicle, wherein information about the object that has been assigned a high priority is passed to the at least one ADAS, and the at least one ADAS performs a function to avoid the object.

7. The system of claim 6 wherein the final confidence level indicates that the final lane model is more accurate than the base lane model.

8. The system of claim 7 wherein the base and the final lane models comprise lane positioning, lane markings, lane curvature, speed, and trajectory data for the host vehicle and for any objects within a predefined area around the host vehicle.

9. The system of claim 8 wherein the V2V data comprises lane positioning, speed, and trajectory data for any remote V2V equipped vehicles in communication with the host vehicle and within a predefined area around the host vehicle, and for any objects sensed by any remote V2V vehicles in communication with the host vehicle and within a predefined area around the host vehicle.

10. The system of claim 6, wherein the controller fuses together further comprises comparing the visual data to the V2V data and determining an accuracy and a precision of the visual data and the V2V data.

\* \* \* \* \*